2 Sheets—Sheet 2.

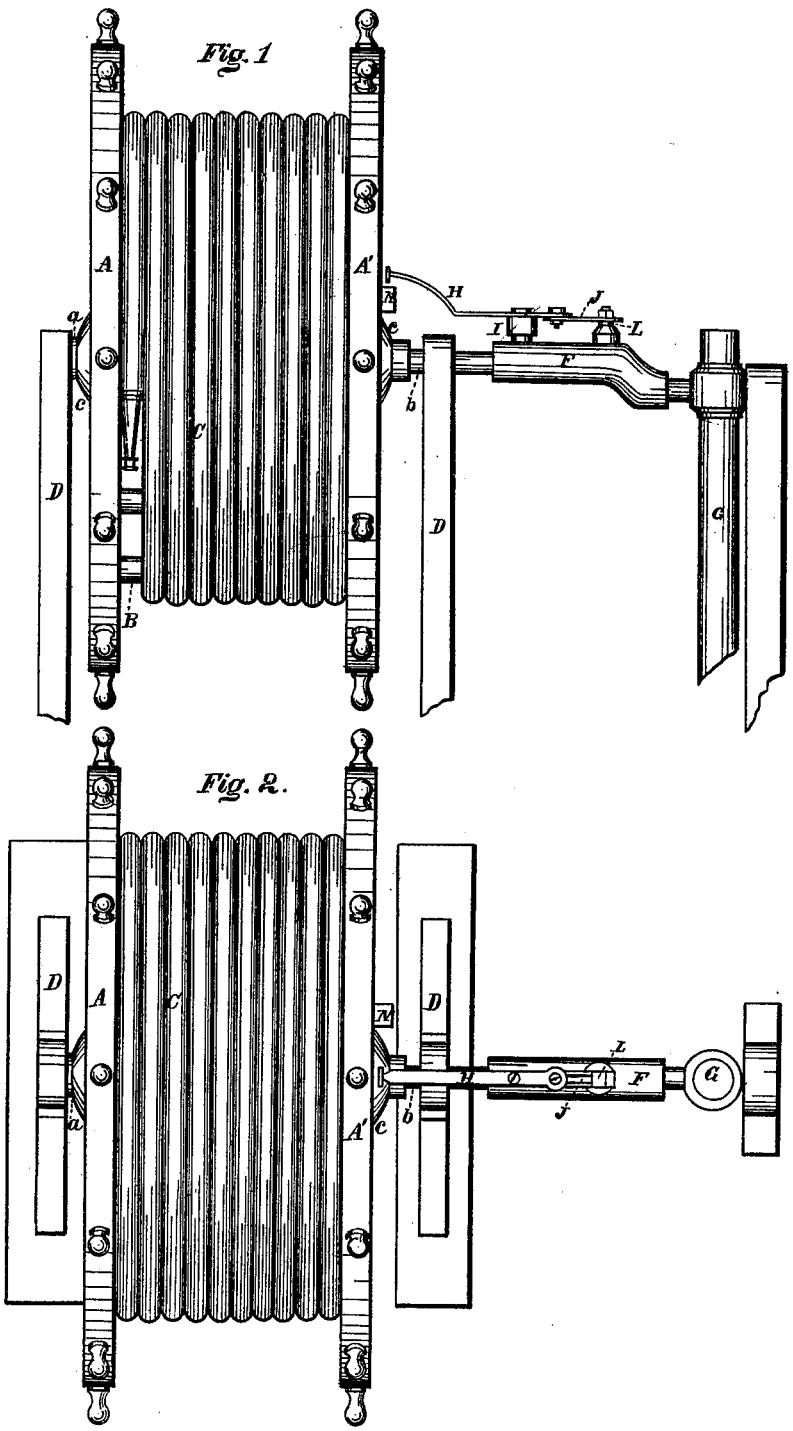

W. NERACHER.
AUTOMATIC HOSE-REEL AND WATER-COCK.

No. 176,337. Patented April 18, 1876.

Witnesses.
E. W. Cross.
O. Longman,

Inventor
Wm Neracher
Per Burridge & Co
Attys.

UNITED STATES PATENT OFFICE.

WILLIAM NERACHER, OF CLEVELAND, OHIO.

IMPROVEMENT IN AUTOMATIC HOSE-REELS AND WATER-COCKS.

Specification forming part of Letters Patent No. 176,337, dated April 18, 1876; application filed January 22, 1876.

*To all whom it may concern:*

Be it known that I, WILLIAM NERACHER, of Cleveland, in the county of Cuyahoga and State of Ohio, have invented new and useful Improvements in Automatic Hose-Reel and Water-Cock, of which the following is a description, reference being had to the accompanying drawings, in which—

Figure 3:
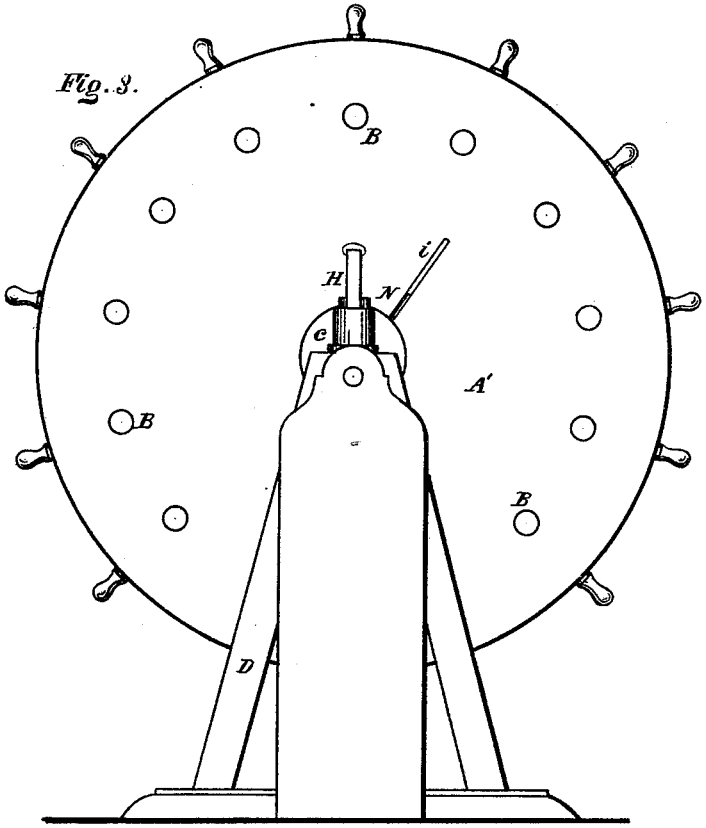
Figure 4:
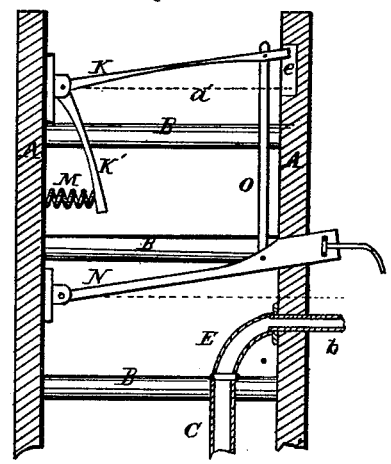

Figure 1 is a front view of the reel. Fig. 2 is a plan view. Fig. 3 is a side view. Fig. 4 is a detached section.

Like letters of reference refer to like parts in the several views.

The nature of this invention relates to a hose-reel, and which has for its object the combination of said reel with a hydrant in such peculiar manner that as the hose is being unwound from the reel it is automatically supplied with water from the hydrant, the cock of which is opened by the reel as it revolves by the unwinding therefrom of the hose, by which means is avoided the necessity of attaching the unwound hose to a hydrant for supplying the same with water.

A more full and complete description of the invention is as follows: The reel referred to consists of the sides A A′, secured to each other by a series of bars, B, one of which is shown in Fig. 1; also in Fig. 4. On said bars is wound the hose, between the sides A A′, as shown in the drawing. The reel is hung in the standards D on trunnions $a$ and $b$, Fig. 1. Said trunnions are fastened to the reel by flanges $c$. The trunnion $b$ is tubular, and passes through the side of the reel and terminates in an elbow, E, Fig. 4, to which is attached a hose, $c$. The outer end of the tubular trunnion is connected by a loose joint (made water-tight with packing) to the end of the cock F, projecting from the hydrant G or other water source. H, Fig. 1, is a lever pivoted to a stud, I. The short arm of said lever is attached to the handle J of the key L of the cock, substantially as shown in the drawings. Near the periphery of the inside of the side A of the reel is hinged a right-angled lever, one arm, K, of which extends across the reel and terminates in the opposite side A′ in a recess, $e$, made therein, as will be seen in Fig. 4. The other arm, K′, of the lever depends toward the center of the reel, between the extreme end of which and the side of the reel is interposed a spring, M, whereby the free end of the arm K is raised in the recess, as will be seen in said Fig. 4. Also, to the inside of the side A is hinged an arm, N, which extends across the reel and through the side A′, from which it projects through a slot, $i$, Fig. 3, so far as to be within reach of the end of the lever H of the cock, as shown in Figs. 1 and 2. Said arm N is connected to the arm K of the right-angled lever referred to by a link, O, whereby they have a co-operation for a purpose presently shown.

It will be observed that the pivotal end of the arm K of the lever is in the circle of the series of bars B, whereas its free end, by its elevation, is above them, but which, however, will be depressed to said circle of bars, as indicated by the dotted line $a'$, on winding the hose upon the reel, in which event the arm serves for a bar.

The above-described reel, in combination with a hydrant, is intended for local use—as, for instance, in dwellings, warehouses, factories, &c., to be used in the event of fire, or other needful purposes. To this end the hose is kept wound upon the reel. On winding up the hose the free end of the arm K of the right-angled lever will become depressed, as indicated by the dotted line $a'$. This depression of the arm will bring the end that is projecting through the side of the reel below the end of the lever H of the cock, as will be seen in Fig. 1. The position of said lever, when the cock is closed, is straight therewith, as shown in Fig. 2. This relation of the lever and arm, in respect to each other, allows the projecting end of the arm to pass under the end of the lever H of the cock until the unwinding of the hose from the reel is completed, or so much run off as will permit the arm to rise upward by the reaction of the spring M. This elevation of the arm will cause the projecting end of the arm N to engage the end of the lever H, and turn it so far around as to open the cock and allow the water from the hydrant to flow into the hose for immediate use, thereby saving the time and trouble of attaching the unwound hose to the hydrant, which, in the event of fire, is a matter of great importance, as during such times excitement and confusion usually prevail, so that the attachment of the hose to the hydrant is likely to be delayed or improperly done, thereby causing disaster, which would, possibly, have been avoided had the hose been already attached to the hydrant in the manner as above described.

Under ordinary circumstances it is a matter of convenience to have the hose attached to the hydrant at all times, thereby saving the trouble of doing so when the hose is required for ordinary use.

What I claim as my invention, and desire to secure by Letters Patent, is—

1. The right-angled lever, consisting of the arms K and K' and spring M, in combination with the arm N and hose-reel, substantially in the manner as described, and for the purpose set forth.

2. The hose-reel and right-angled lever above described, spring M, and arm N, arranged to operate in combination with the lever H, substantially as set forth, for the purpose specified.

3. The hose-reel and tubular trunnion $b$, in combination with the cock F and hydrant G, in the manner substantially as described, for the purpose set forth.

4. The combination of the reel-hose C, and right-angled lever, herein described, spring M, arm N, link O, tubular trunnion $b$, lever H, cock F, and hydrant G, substantially in the manner as described, and for the purpose set forth.

WILLIAM NERACHER.

Witnesses:
W. H. BURRIDGE,
E. W. CROSS.